Jan. 14, 1969     G. H. FATHAUER     3,421,537
LEVEL CONTROL
Filed Dec. 29, 1966
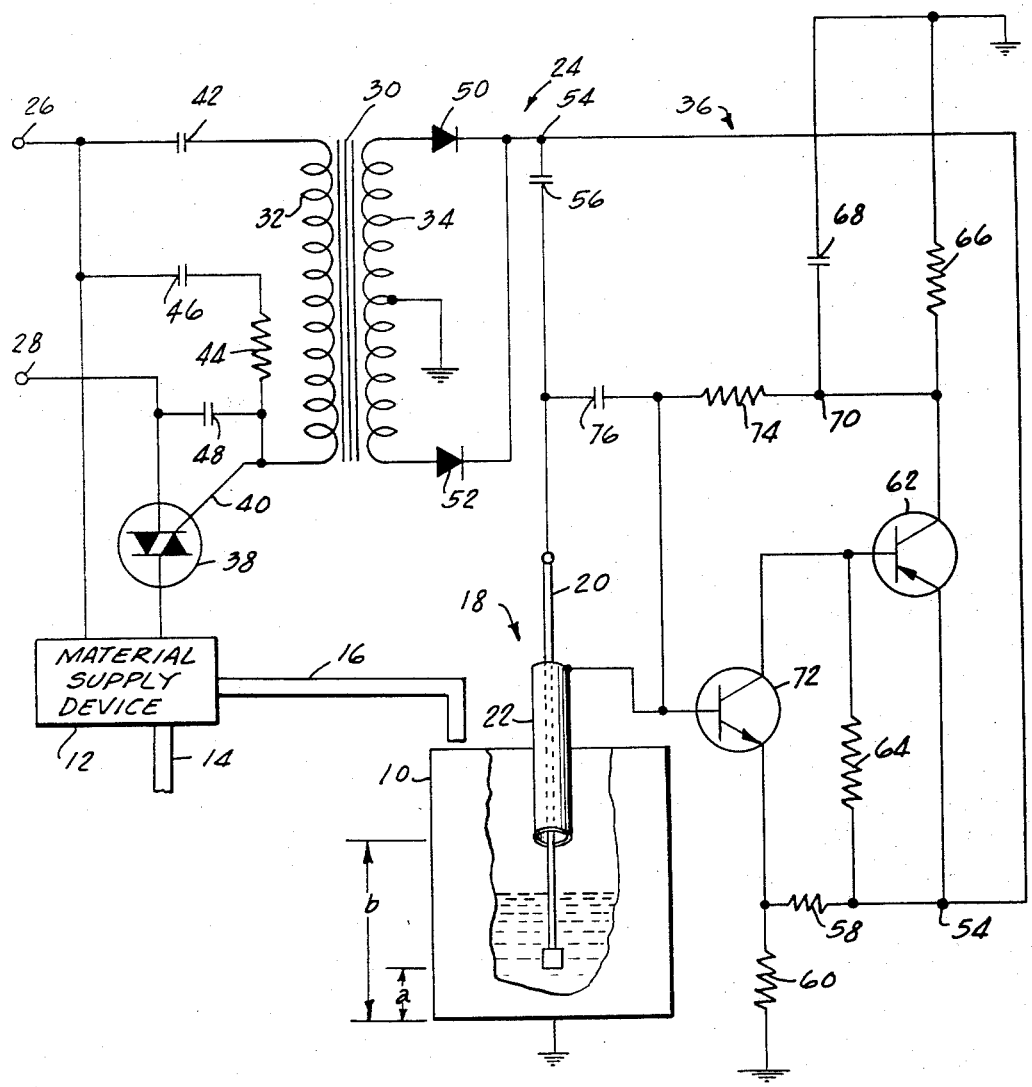
INVENTOR.
GEORGE H. FATHAUER
ATTORNEYS

United States Patent Office 3,421,537
Patented Jan. 14, 1969

3,421,537
LEVEL CONTROL
George H. Fathauer, Decatur, Ill., assignor to The Dole Valve Company, Morton Grove, Ill., a corporation of Illinois
Filed Dec. 29, 1966, Ser. No. 605,671
U.S. Cl. 137—392      9 Claims
Int. Cl. E03b *11/00;* F16k *21/18;* F17d *3/00*

ABSTRACT OF THE DISCLOSURE

A circuit for controlling the supply of a material to a tank by connection of a material supply device in series with a controlled rectifier in the primary side of a transformer and connection of a material level responsive circuit in the secondary side of the transformer, such that the reflected impedance produced by the level responsive circuit from the secondary to the primary is indicative of the level of the material in the tank. The reflected impedance controls the current in the primary side, thus controlling the conduction of the controlled rectifier, which, in turn, controls the connection of a source of voltage to the material supply device.

---

This invention relates generally to a level control circuit for a system wherein a material is to be maintained within predetermined levels in a tank, and more particularly to a control system for maintaining the amount of an electrically conductive material within predetermined levels in a tank by controlling the operation of the device which supplies the material to the tank in accordance with sensed levels of the material in the tank. The present invention has particular application as a level control for a carbonator in a drink dispenser, but is also applicable to other types of systems, such as ice makers. The level control circuit of the present invention employs a probe which is inserted into the material receiving tank to sense the level of the material therein.

A problem associated with level control circuits of the type employing a probe disposed in the material storage or receiving tank, is that of isolating the probe from high voltage, such as that found on a power line. For purposes of safety, therefore, it is necessary that the probe which senses the level of the material in a tank be isolated from the main power supply or from any other line having a comparable amount of voltage thereon.

Another problem associated with the probe type of level controls, particularly those employed for carbonators, is that of maintaining direct current off the probe in order to eliminate plating or electrical erosion thereon.

Therefore, it is an object of the present invention to provide a probe type of level control circuit wherein the probe is isolated from the line current.

It is another object of the persent invention to provide a probe type of level control circuit wherein the probe is not subjected to direct current in order to eliminate plating or electrical erosion thereof.

An important feature of the present invention resides in the provision of a transformer having the primary side thereof connected between a source of voltage and the material supply device and a secondary side thereof connected to a level sensing circuit, such that the reflected impedance in the transformer energizes the load in the primary circuit thereof.

These and other objects, features and advantages of the present invention will be more fully realized and understood from the following detailed description when taken in conjunction with the accompanying drawing wherein the single figure is a partly schematic and partly diagrammatic illustration of the level control circuit constructed in accordance with the principles of the present invention.

With reference to the drawing in detail, there is illustrated a tank or other storage device, generally designated with the reference numeral 10. A material supply device 12, such as a pump, solenoid, or the like, controls the flow of a material from a conduit 14 to a conduit 16 which extends to the tank 10.

A probe 18 includes an inner probe element 20 and an outer probe element 22 mounted within the tank 10. Although the probe 18 of the present exemplification is illustrated as being of the coaxial type, it is to be understood that other types of probes may be employed. Furthermore, the separate elements of the probe 18 may be spaced from one another, or may be mounted adjacent one another on a wall of the tank 10. If desired, the probe 18 may be formed of two electrically conductive strips electrically isolated from and mounted on one or more walls of the tank 10.

One end of the inner probe element 20 is mounted a distance $a$ from the bottom of the tank 10 and one end of the outer probe element 22 is spaced a distance $b$ from the bottom of the tank 10. The dimensions $a$ and $b$ define the desired limits or levels of the material within the tank 10. Therefore, when the material reaches the level $a$ within the tank 10, the material supply device 12 will be actuated to fill the tank until the material reaches the level $b$. At that point, the material supply device 12 will be de-energized until the material within the tank 10 again reaches the level $a$.

The material supply device 12 is energized and de-energized from a circuit generally designated with the reference numeral 24 having a pair of terminals 26 and 28 disposed for connection to a source of alternating current voltage. The circuit 24 includes a transformer 30 having a primary winding 32 and a secondary winding 34. The source of voltage on the terminals 26 and 28 and the material supply device 12 are connected in the primary side or circuit of the transformer 32 and the probe 18 with a level responsive circuit, generally designated with the reference numeral 36, are connected in the secondary side or circuit of the transformer 30.

By controlling the impedance of the circuit 36 in response to the level of the material in the tank 10, the current through the primary winding 32 is controlled accordingly to control the energization of the material supply device 12.

In particular, the material supply device is connected to the terminal 26 and through a triac 38 to the terminal 28. It is to be understood that any type of thyristor may be employed in place of the triac 38, but that a bipolar device, such as the triac 38, is preferred. A gate electrode 40 of the triac 38 is connected to one end of the primary winding 32 and the other end of the primary winding 32 is connected through a capacitor 42 to the terminal 26. The capacitor 42 produces a leading current to turn on the triac 38 early in each cycle of the alternating current voltage applied to the terminals 26 and 28. In addition, the gate electrode 40 is connected through a resistor 44 and a capacitor 46 in series with one another to the terminal 26. Furthermore, the gate electrode 40 is connected through a capacitor 48 to the terminal 28. The capacitor 46 also adds leading current to assist in turning on the triac 38 early in each cycle of the alternating current voltage applied to the terminals 26 and 28. The resistor 44 and capacitor 48 are employed for filtering out line transients.

The windings 32 and 34 of the transformer 30 are of sufficiently high impedance to maintain the triac 38 non-conductive when there is no current flowing in the secondary winding 34. As a result of no current flowing in the secondary winding 34, a relatively large reflected impedance will be realized in the primary circuit of the transformer 30 and the triac 38 will remain nonconductive. However, when current is caused to flow in the secondary winding 34, the reflected impedance is reduced sufficiently to render the triac 38 conductive and energize the material supply device 12. This flow of current in the secondary winding 34 is initiated or controlled by the level responsive circuit 36.

In particular, a pair of rectifiers 50 and 52 have the anodes thereof connected to opposite ends of the secondary winding 34 and the cathodes thereof connected to one another to form a full wave rectifier circuit. A center tap of the secondary winding 34 is grounded. The cathodes of the rectifiers 50 and 52 are connected to a circuit point 54, at which point the transformed voltage on the terminals 26 and 28 is in the form of full wave rectified cycles of voltage.

A capacitor 56 is connected between the circuit point 54 and the inner probe element 20. A pair of resistors 58 and 60 are connected between the circuit point 54 and a ground terminal and form a voltage divider therebetween. The emitter electrode of a transistor 62 is connected to the circuit point 54 and the base electrode thereof is connected through a biasing resistor 64 to the circuit point 54. The collector electrode of the transistor 62 is connected through a resistor 66 and a capacitor 68 in parallel with one another to ground potential. The resistor 66 and capacitor 68 form a filter network for producing a DC voltage at a circuit point 70 when the transistor 62 is conductive.

The emitter of an NPN transistor 72 is connected to the junction point between the resistors 58 and 60. In addition, the collector electrode of the transistor 72 is connected to the base electrode of the transistor 62 and through the resistor 64 to the circuit point 54. The base electrode of the transistor 72 is connected through a resistor 74 to the circuit point 70 and through a capacitor 76 to the inner probe element 20. In addition, the base electrode of the transistor 72 is connected directly to the outer probe element 22. It can be readily appreciated that the resistor 64 performs not only as a biasing resistor for the transistor 62, but performs as a voltage divider element in combination with the transistor 72 and the resistor 60. That is, when the transistor 72 is rendered conductive, the resistor 64 is placed essentially in parallel with the resistor 58. Since the resistor 64 is of less resistance value than the resistance value of the resistor 58, conduction of the transistor 72 will produce a greater current flow in the secondary winding 34 of the transformer 30.

In operation, it will be assumed initially that the level of the material in the tank 10 is at the level $a$, but not in contact with the inner probe element 20. At that point in the operation, the AC path through the capacitors 56 and 76 to the base electrode of the transistor 72 will render the transistor 72 conductive. As a result, the current through the secondary winding 34 of the transformer 30 will immediately increase when the transistor 72 is rendered conductive to cause the triac 38 to be rendered conductive and energize the material supply device 12 to supply material to the tank 10. As the level of the material in the tank 10 exceeds the dimension $a$, the signal on the inner probe element 20 will be shorted to ground by virtue of the electrical connection created through the material in the tank 10 and the connection of the tank 10 to ground potential. At this point in the operation, however, the transistor 62 is conductive, by virtue of the transistor 72 having been conductive, and a DC voltage is developed at the circuit point 70 to maintain the transistor 72 conductive. When the transistor 62 is rendered fully conductive, the DC developed at the circuit point 70 maintains the transistor 72 conductive. Without such DC voltage being produced at the circuit point 70, the transistor 72 would be rendered nonconductive at each half cycle of the voltage supplied to the base electrode thereof through the capacitors 56 and 76. Therefore, the DC voltage developed at the circuit point 70 will maintain the transistor 72 conductive. This DC voltage on the circuit point 70 maintains the transistor 72 conductive until the electrically conductive material within the tank 10 reaches the level $b$ therein.

When the material within the tank 10 reaches the level $b$, the DC voltage developed on the circuit point 70 is shorted to ground, rendering the transistor 72 nonconductive. As a result, the only circuit path for the voltage on the circuit point 54 is through the resistors 58 and 60. Consequently, when the transistor 72 is rendered nonconductive, the current through the secondary winding 34 will decrease considerably, causing a decrease in the current through the primary winding 32 by virtue of the reflected impedance therein which will result in the triac 38 being rendered nonconductive to deenergize the material supply device 12.

It can be readily appreciated that various modifications can be made in the circuit described above. For instance, the material supply device 12 can be placed in the circuit 36 in place of the resistor 66. However, the high voltage required for energizing the material supply device 12 would result in problems with safety and a second transformer would be required for isolation purposes. However, such a modification would eliminate the need for the entire circuit in the primary side of the transformer 30 including the triac 38, the capacitors 42, 46, and 48, and the resistor 44.

In one preferred embodiment of the present invention, the following values were employed successfully:

| | | |
|---|---|---|
| C42 | microfarads | 0.22 |
| C46 | do | 0.10 |
| C48 | do | 0.47 |
| C56 | do | 0.10 |
| C68 | do | 47 |
| C76 | do | 0.10 |
| R44 | ohms | 1000 |
| R58 | do | 12000 |
| R60 | do | 3300 |
| R64 | do | 4700 |
| R66 | do | 150 |
| R74 | do | 22000 |

The principles of the invention explained in connection with the specific exemplification thereof will suggest many other applications and modifications of the same. It is accordingly desired that, in construing the breadth of the appended claims they shall not be limited to the specific details shown and described in connection with the exemplification thereof.

The invention claimed is:
1. A circuit for controlling the energization of a device which supplies material to a tank, comprising
 (a) a source of voltage,
 (b) a controlled rectifier connected in series with the device across said source of voltage, and
 (c) means for controlling the conduction of said controlled rectifier, including
  (1) means for producing a signal having a value proportional to the level of the material in the tank, and
  (2) means responsive to a first predetermined value of said signal for rendering said controlled rectifier conductive and further responsive to a second predetermined value of said signal for rendering said controlled rectifier nonconductive.

2. A circuit as defined in claim 1, wherein said controlled rectifier includes a control electrode, said rendering means includes a transformer having a first winding connected between said source of voltage and said control electrode and a second winding, said signal producing means includes an impedance device variable in response to the level of the material in the tank and connected to said second winding, the impedance of said variable impedance device being reflected to said first winding and controlling the amount of current therethrough.

3. A circuit as defined in claim 1, wherein said controlled rectifier includes a control electrode, said rendering means includes a transformer having a first winding connected between said source of voltage and said control electrode and a second winding, said signal producing means includes an electrically conductive probe disposed in the tank, means connecting the tank to said second winding, and a trasistor having base, emitter and collector electrodes, said emitter and collector electrodes being connected across at least one portion of said second winding and said base electrode connected to said probe.

4. A circuit for controlling the energization of a device which supplies material to a tank, comprising
 (a) a source of voltage,
 (b) a transformer having a primary winding and a secondary winding,
 (c) means connected in series with said transformer and said source of voltage and responsive to the level of current in said primary winding for actuating the material supply device, and
 (d) means responsive to the level of the material in the tank for controlling the level of current in said secondary winding.

5. A circuit as defined in claim 4, wherein said actuating means is a thyristor.

6. A circuit as defined in claim 4, wherein said level responsive means includes a pair of probes disposed in the tank, each at a different level therein, one of said probes being connected on one side of said secondary winding and the tank being connected on another side of said secondary winding, means connected in series with said one probe for limiting the current flow in said secondary winding to a predetermined value means responsive to the interruption of current flow from said one probe to said tank for increasing the current flow in said secondary winding above the predetermined value, and means for rendering said interruption responsive means inoperative in response to the material achieving a height of the other of said probes in the tank.

7. A circuit as defined in claim 6, wherein said level responsive means includes a voltage divider circuit connected across said secondary winding, said interruption responsive means includes a first transistor, an emitter and collector of said first transistor being connected across a portion of said voltage divider, a base of said first transistor being connected to said one probe.

8. A circuit as defined in claim 7, wherein said level responsive means includes a second transistor, a first resistor connected in series with an emitter and collector of said second transistor between one side of said secondary winding and the base of said first transistor, and a base of said second transistor being connected to one of the emitter and collector of said first transistor.

9. A circuit as defined in claim 8, wherein said level responsive circuit includes a capacitor connected between said one probe and the base of said first transistor, a second resistor connected between the base of said second transistor and the one side of said secondary winding, and a filter circuit connected to the base of said first transistor.

References Cited

UNITED STATES PATENTS 3,279,379  10/1966  Klyce _____ 137—392 X
3,351,084  11/1967  Halkiades _____ 137—392 X WILLIAM S. BURDEN, *Primary Examiner.*